(12) United States Patent
Li et al.

(10) Patent No.: US 12,516,010 B2
(45) Date of Patent: Jan. 6, 2026

(54) CRYSTAL FORM OF REDUCED COENZYME Q10 AND PREPARATION METHOD THEREFOR

(71) Applicant: XINKAILIAN BIOTECHNOLOGY (HAINAN) CO., LTD, Hainan (CN)

(72) Inventors: Lun Li, Hainan (CN); Niangen Chen, Hainan (CN); Gen Li, Hainan (CN)

(73) Assignee: XINKAILIAN BIOTECHNOLOGY (HAINAN) CO., LTD, Hainan (CN)

( * ) Notice: Subject to any disclaimer, the term of this patent is extended or adjusted under 35 U.S.C. 154(b) by 0 days.

(21) Appl. No.: 18/981,782

(22) Filed: Dec. 16, 2024

(65) Prior Publication Data

US 2025/0197332 A1 Jun. 19, 2025

(30) Foreign Application Priority Data

Dec. 19, 2023 (CN) .......................... 202311751931.0

(51) Int. Cl.
C07C 43/23 (2006.01)
C07C 41/26 (2006.01)

(52) U.S. Cl.
CPC .............. *C07C 43/23* (2013.01); *C07C 41/26* (2013.01); *C07B 2200/13* (2013.01)

(58) Field of Classification Search
CPC ...... C07C 43/23; C07C 41/26; C07B 2200/13
USPC ......................................................... 568/651
See application file for complete search history.

(56) References Cited

U.S. PATENT DOCUMENTS

| 2004/0214301 A1 | 10/2004 | Ueda et al. |
| 2014/0120073 A1 | 5/2014 | Kawachi et al. |
| 2016/0101053 A1 | 4/2016 | Xu et al. |
| 2021/0317057 A1 | 10/2021 | Yamaguchi et al. |

FOREIGN PATENT DOCUMENTS

| CN | 1849287 A | 10/2006 |
| CN | 103635452 A | 3/2014 |
| CN | 104119209 A | 10/2014 |
| CN | 105582818 A | 5/2016 |
| CN | 112839921 A | 5/2021 |
| EP | 1666445 A1 | 6/2006 |
| JP | 2003089669 A | 3/2003 |
| WO | 03006409 A1 | 1/2003 |
| WO | 2012176842 A1 | 12/2012 |

OTHER PUBLICATIONS

Chinese Second Office Action issued on Mar. 10, 2025 for the Chinese priority application No. 202311751931.0.
CNIPA First Office Action corresponding to Application No. 202311751931.0; Issued date of Oct. 30, 2024.

*Primary Examiner* — Ana Z Muresan
(74) *Attorney, Agent, or Firm* — Yue (Robert) Xu; Apex Attorneys at Law, LLP

(57) ABSTRACT

A crystal form of reduced coenzyme Q10 is provided. A method for preparing the crystal form of reduced coenzyme Q10 is provided. In addition, a crystalline solid of reduced coenzyme Q10 comprising the crystal form and a reduced coenzyme Q10 composition comprising the crystal form of reduced coenzyme Q10 are also provided.

3 Claims, 6 Drawing Sheets instrument
 instrument name : LC-101
  system controller
   model : LC-2030 Controller
  automatic sampler
   model : LC-2030 Autosampler
  column oven
   model : LC-2030 Oven instrument
 detector A
  model : LC-2030 UV Detector
 pump A
  model : LC-2030 Pump Chromatogram mV peak Table
detector A 290 nm

| peak number | retention time | area | height | tailing factor | resolution (USP) | theoretical plate count (USP) | area% |
|---|---|---|---|---|---|---|---|
| 1 | 9.273 | 11289.31 | 581.6 | 1.108 | -- | 5145.5 | 0.123 |
| 2 | 11.447 | 9575.77 | 295.3 | 1.128 | 3.072 | 2599.7 | 0.104 |
| 3 | 13.199 | 1808.02 | 70.0 | -- | 2.187 | 5611.2 | 0.020 |
| 4 | 14.404 | 8946971.30 | 248707.4 | 1.694 | 1.439 | 3537.7 | 97.327 |
| 5 | 19.558 | 13804.99 | 393.3 | 1.177 | 5.463 | 7255.9 | 0.150 |
| 6 | 22.395 | 178545.11 | 4255.5 | 1.114 | 2.799 | 6534.5 | 1.942 |
| 7 | 24.173 | 30686.84 | 697.4 | 1.054 | 1.542 | 6522.6 | 0.334 |
| total | | 9192681.36 | 255000.5 | | | | 100.000 | instrument
instrument name : LC-101
    system controller
        model : LC-2030 Controller
    automatic sampler
        model : LC-2030 Autosampler
    column oven
        model : LC-2030 Oven instrument
    detector A
        model : LC-2030 UV Detector
    pump A
        model : LC-2030 Pump Chromatogram peak Table
detector A 290nm

| peak number | retention time | area | height | tailing factor | resolution (USP) | theoretical plate count (USP) | area% |
|---|---|---|---|---|---|---|---|
| 1 | 9.260 | 10762.39 | 549.0 | 1.125 | -- | 5015.8 | 0.244 |
| 2 | 11.481 | 3743.21 | 118.1 | -- | 3.293 | 3090.9 | 0.085 |
| 3 | 13.601 | 2390.99 | 111.4 | 0.986 | 2.990 | 8457.0 | 0.054 |
| 4 | 14.607 | 3610726.91 | 114197.4 | 1.383 | 1.403 | 4809.3 | 81.984 |
| 5 | 19.532 | 11071.88 | 343.8 | 1.100 | 5.512 | 6839.4 | 0.272 |
| 6 | 22.331 | 752878.51 | 17818.0 | 1.162 | 2.723 | 6469.7 | 17.095 |
| 7 | 24.112 | 11714.85 | 275.8 | -- | 1.579 | 7089.5 | 0.266 |
| total | | 4404188.74 | 133413.7 | | | | 100.000 | instrument
instrument name: LC-101
  system controller
    model: LC-2030 Controller
  automatic sampler
    model: LC-2030 Autosampler
  column oven
    model: LC-2030 Oven instrument
  detector A
    model: LC-2030 UV Detector
  pump A
    model: LC-2030 Pump Chromatogram peak Table
detector A 290 nm

| peak number | retention time | area | height | tailing factor | resolution (USP) | theoretical plate count (USP) | area% |
|---|---|---|---|---|---|---|---|
| 1 | 9.191 | 6761.35 | 351.2 | 1.097 | -- | 4951.6 | 0.161 |
| 2 | 11.358 | 5266.78 | 160.6 | 1.032 | 3.041 | 2536.1 | 0.126 |
| 3 | 14.459 | 4154471.22 | 129676.5 | 1.399 | 3.526 | 4559.9 | 99.146 |
| 4 | 22.183 | 17435.22 | 432.9 | 1.031 | 7.936 | 6622.7 | 0.416 |
| 5 | 23.895 | 6313.13 | 158.3 | 1.128 | 1.630 | 8960.2 | 0.151 |
| total | | 4190247.70 | 130779.5 | | | | 100.000 | instrument
instrument name : LC-101
    system controller
        model : LC-2030 Controller
    automatic sampler
        model : LC-2030 Autosampler
    column oven
        model : LC-2030 Oven instrument
detector A
    model : LC-2030 UV Detector
pump A
    model : LC-2030 Pump Chromatogram peak Table
detector A 290 nm

| peak number | retention time | area | height | tailing factor | resolution (USP) | theoretical plate count (USP) | area% |
|---|---|---|---|---|---|---|---|
| 1 | 6.790 | 1668.27 | 98.3 | 1.137 | -- | 3602.7 | 0.016 |
| 2 | 9.268 | 31624.64 | 1618.1 | 1.133 | 5.107 | 5126.0 | 0.310 |
| 3 | 10.381 | 1272.70 | 69.0 | 0.869 | 2.195 | 6986.3 | 0.012 |
| 4 | 11.513 | 11141.55 | 326.7 | 1.039 | 1.585 | 2445.0 | 0.109 |
| 5 | 14.362 | 10031230.15 | 272623.7 | 1.742 | 2.955 | 3320.6 | 98.202 |
| 6 | 19.546 | 30755.33 | 851.3 | 1.177 | 5.284 | 6559.1 | 0.301 |
| 7 | 22.387 | 66668.90 | 1613.1 | 1.060 | 2.753 | 6637.9 | 0.653 |
| 8 | 24.147 | 40529.11 | 902.8 | 1.201 | 1.533 | 6523.3 | 0.397 |
| total | | 10215890.66 | 278102.9 | | | | 100.000 |

CRYSTAL FORM OF REDUCED COENZYME Q10 AND PREPARATION METHOD THEREFOR

CROSS REFERENCE

The present application claims the priority of Chinese Patent Application No. 202311751931.0, filed with the China National Intellectual Property Administration on Dec. 19, 2023, and titled with "CRYSTAL FORM OF REDUCED COENZYME Q10 AND PREPARATION METHOD THEREFOR", which is hereby incorporated by reference in its entirety.

FIELD

The present disclosure relates to the technical field of a compound crystal, and in particular to a crystal form of reduced coenzyme Q10 and a preparation method therefor.

BACKGROUND

Coenzyme Q10, also known as ubiquinone 10, with a chemical name of 2,3-dimethoxy-5-methyl-6-decaprenyl-benzoquinone, is structurally similar to Vitamin K. It was discovered and its chemical structure was confirmed by scientists in the middle of the last century. Coenzyme Q10, a vitamin like compound, is a liposoluble organic quinone compound widely distributed in organisms, and has important physiological and pharmacological effects. In the early 1980s, Ernster from Sweden revealed that the vitamin-like coenzyme Q10 has capacity of antioxidation and scavenging free radicals, and in 1972 Harman elaborated on the relationship between mitochondrial function and aging. Coenzyme Q10 is primarily bound to the mitochondrial membrane and is a coenzyme of the respiratory chain, playing a role in hydrogen transfer in the energy metabolism of organisms. Coenzyme Q10 is a metabolic activator, activating cellular respiration, providing a power source of cell, and accelerating the production of adenosine triphosphate (ATP). Also, Coenzyme Q10 itself is a natural antioxidant produced by the cells themselves, which can inhibit mitochondrial peroxidation and help maintain the structural integrity of biological membranes. In addition, as a non-vitamin nutrient, it can activate cellular respiration, accelerate the production of ATP with high energy, strengthen myocardial metabolism, improve the efficiency of heart beat, regulate the hypoxia of cells and tissues, and have good protection and beneficial effect on the liver, brain, heart and nervous system after eating. Coenzyme Q10 also can specifically strengthen immunity, improve the phagocytosis rate of phagocytes and increase antibody production. A large number of domestic and foreign clinical researches show that coenzyme Q10 has excellent therapeutic effects on diseases such as heart disease, hypertension, cerebrovascular disorders, scurvy, and viral hepatitis, and can be used as a non-specific immune enhancer, cell metabolism and cellular respiratory activator. Recently, it was found that coenzyme Q10 has a significant auxiliary therapeutic effect on cancer and acquired immune deficiency syndrome. Therefore, coenzyme Q10 has an irreplaceable role and broad application prospect in human health care, delaying aging and improving body immunity. Due to its lack of toxicity and side effects, as well as its non-interaction with other drugs, Coenzyme Q10 has become an important drug and healthcare product.

Most of the coenzyme Q10 currently marketed is oxidized coenzyme Q10, but it has been found that reduced coenzyme Q10 with two electrons, the reduced form from oxidized coenzyme Q10, exhibits higher oral absorption than oxidized coenzyme Q10, and is also the main form playing a major role in vivo, with the only difference being that one is in the form of benzoquinone and the other is in the form of benzene glycol.

In addition, at present, in the public technical literature on the manufacture of reduced oxygenated coenzyme Q10, except for the techniques involving extraction from fermentation broth (reduced coenzyme Q10 predominates during fermentation, but is gradually oxidized to oxidized coenzyme Q10 during extraction), most of the technical literature involves using oxidized coenzyme Q10 as a raw material and reducing it to reduced coenzyme Q10 by conventional reducing agents. The reducing agents involved include sodium borohydride, sodium hydrosulfite, ascorbic acid and certain specific amino acids. The solvents used mainly include aliphatic hydrocarbons, and fatty acid esters. In addition, there are several known methods of producing reduced coenzyme Q10 in crystalline form. For example, a method for producing a crystal by precipitating reduced coenzyme Q10 in an alcohol solution and/or a ketone solution was reported (WO2003/006409), and a method of adding a highly concentrated liquid phase of reduced coenzyme Q10 to a poor solvent for crystallization was reported (Japanese patent application 2003 089669).

On the other hand, patent literature (WO2012/176842) recited the polymorphism observed for reduced coenzyme Q10, and disclosed a novel crystal form, which was different from those described in the above literature, was very stable and had excellent other physical properties compared to the existing reduced coenzyme Q10, and a preparation method thereof was also disclosed. The newly discovered crystal form (hereinafter, the crystal is referred to as Form II type of reduced coenzyme Q10 crystal or Crystal Form II) was reported to be very stable and to have other excellent physical properties compared to existing reduced coenzyme Q10 (hereinafter, the crystal is referred to as Form I type of reduced coenzyme Q10 crystal or Crystal Form I).

However, due to its structure, reduced coenzyme Q10 is easily oxidized to oxidized coenzyme Q10 by oxygen in the air during chemical manufacturing process, for example, coenzyme Q10 primarily presents in its reduced form in fermentation broth during fermentation process the and gradually become oxidized coenzyme Q10 during extraction process. Moreover, complete elimination of oxygen molecular in the scale of commercial production is very difficult. Thus, residual oxygen in the manufacturing process results in a large adverse effect, and a virtually un-removable oxidized coenzyme Q10 was generated and then adulterated in the product, leading to a reduction in the purity of the product. It is also found that the product is stable in solvent, but vulnerable to oxidation during filtration, drying and storage. In order to obtain high-purity reduced coenzyme Q10 in crystal form, it is important to fully protect reduced coenzyme Q10 from the above oxidation.

In addition, the literature mentions that the crystal form has a relatively large influence on its oxidation rate, but it was shown that the crystal form obtained according to different examples of the prior art literature (WO2012/176842, Form II) was still actually the Form I as determined by X-ray powder diffraction, rather than Form II as reported in the literature. The encapsulation with oil or the addition of an antioxidant has also been reported in the literature, but new substances introduced are detrimental to the product. In addition, the use of aliphatic hydrocarbon solvents such as n-hexane and n-heptane, in addition to ethanol, poses a problem of solvent residues, making it difficult to meet the requirements. The melting point of oxidized or reduced coenzyme Q10 is about 50° C., if the drying temperature is increased, it will easily liquefy. When ethanol is used for crystallization, the resulting product as yellow slurry is easily changed in color and difficult to filter.

SUMMARY

In view of this, one technical problem to be solved by the present disclosure is to provide a crystal form of reduced coenzyme Q10 with high stability and purity, and a preparation method therefor.

The present disclosure provides a crystal form of reduced coenzyme Q10 having an endothermic peak at 52±2° C. in a differential scanning calorimetry trace with a heating rate of 10 k/min.

Preferably, the X-ray powder diffraction pattern with Cu-Kα radiation comprises characteristic peaks at diffraction angles (2θ±0.2°) of 8.95°, 10.04°, 15.09°, 18.65°, 19.03°, 21.61°, and 23.01°.

Preferably, the infrared absorption spectrum of the crystal form of reduced coenzyme Q10 comprises characteristic absorption peaks at wave numbers of 794±1 $cm^{-1}$, 877±1 $cm^{-1}$, 962 $cm^{-1}$, and 1014 $cm^{-1}$ as detected by KBr compression method.

Preferably, the crystal form of reduced coenzyme Q10 has an X-ray powder diffraction pattern as shown in FIG. 1, and/or
an infrared absorption spectrum as detected by KBr compression method as shown in FIG. 2, and/or
a differential scanning calorimetry trace as shown in FIG. 3.

The present disclosure further provides a method for preparing the crystal form of reduced coenzyme Q10 comprising:
step S): crystallizing reduced coenzyme Q10 in the presence of a cyclic ether solvent, a fluorine-containing alcohol solvent and an organic base to obtain the crystal form of reduced coenzyme Q10.

Preferably, step S) comprises:
mixing and dissolving reduced coenzyme Q10 with a cyclic ether solvent under heating, adding a mixed solution of a fluorine-containing alcohol solvent and an organic base, and performing crystallization by cooling to obtain a crystal form of reduced coenzyme Q10.

The crystallization is performed at a temperature of 0° C. to 20° C.

Preferably, the cyclic ether solvent is selected from the group consisting of 2-methyltetrahydrofuran, 3-methyltetrahydrofuran, tetrahydrofuran, 2,5-dimethyltetrahydrofuran, and a combination thereof,
the fluorine-containing alcohol solvent is selected from the group consisting of trifluoromethanol, trifluoroethanol, trifluoropropanol, trifluorobutanol and a combination thereof, and
the organic base is selected from the group consisting of triethylamine, pyridine, piperidine, and a combination thereof.

Preferably, the reduced coenzyme Q10 and the cyclic ether solvent are in a ratio of 1 g:(1-10) mL;
the cyclic ether solvent and fluorine-containing alcohol solvent are in a volume ratio of 1:(1-10); and
the organic base is 0.1% to 10% by mass of the reduced coenzyme Q10.

The present disclosure further provides a crystalline solid of reduced coenzyme Q10 comprising the crystal form of reduced coenzyme Q10 described above.

The present disclosure further provides a reduced coenzyme Q10 composition comprising the crystal form of reduced coenzyme Q10 described above, and/or
the crystalline solid of reduced coenzyme Q10 described above.

The present disclosure provides a crystal form of reduced coenzyme Q10 having an endothermic peak at 52±2° C. in a differential scanning calorimetry trace with a heating rate of 10 k/min. The crystal form of reduced coenzyme Q10 provided by the present disclosure has better stability and other physical properties including water solubility and solvent residue compared to the crystal form of reduced coenzyme Q10 reported in the literature in the prior art. The crystal form provided by the present disclosure also overcomes the drawbacks of the previous reduced coenzyme Q10 that was very susceptible to oxidation and had limitations in its application. Furthermore, the crystal form of reduced coenzyme Q10 and the crystalline solid contain the crystal form provided by the present disclosure not only have excellent stability in physical property, but also are outstanding in terms of high purity and low solvent residue.

DETAILED DESCRIPTION

The embodiments of the present disclosure will be clearly and completely described below in conjunction with the examples of the present disclosure. Obviously, the described examples are only a part of the embodiments of the present disclosure, rather than all the embodiments. All other embodiments obtained by those skilled in the art based on the examples of the present disclosure without any creative work fall within the protection scope of the present disclosure.

The present disclosure provides a novel crystal form of reduced coenzyme Q10, with the physicochemical properties and crystal structure significantly different from those crystal forms of reduced coenzyme Q10 reported in the literature.

Specifically, the present disclosure provides a crystal form of reduced coenzyme Q10 having an endothermic peak at 52±2° C., as determined by differential scanning calorimetry with a heating rate of 10 k/min, more specifically, having an endothermic peak indicating crystal melting at 52±2° C.

Figure 3:
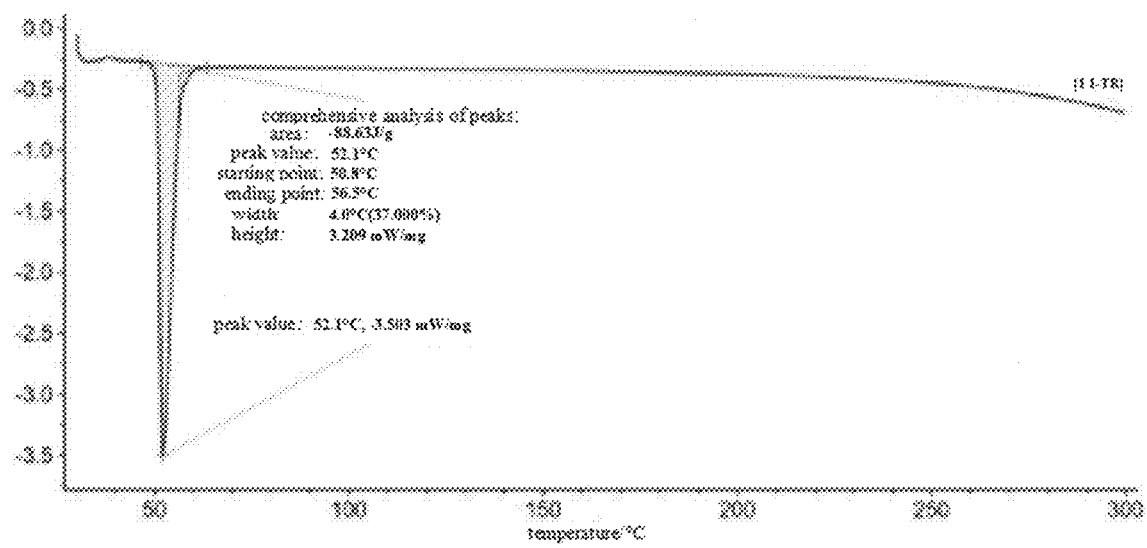
FIG. 3 is the DSC trace of the reduced coenzyme Q10 crystal prepared in Example 1 of the present disclosure.

Further specifically, the crystal form of reduced coenzyme Q10 has differential scanning calorimetry trace as shown in FIG. 3.

According to the present disclosure, the X-ray powder diffraction pattern with Cu-Kα radiation of the crystal form of reduced coenzyme Q10 comprises characteristic peaks at diffraction angles (2θ±0.2°) of 8.95°, 10.04°, 15.09°, 18.65°, 19.03°, 21.61°, and 23.01°, particularly comprises characteristic strong diffraction peaks at diffraction angles (2θ±0.2°) of 8.95°, 19.03° and 23.01°.

Figures 1, 2:
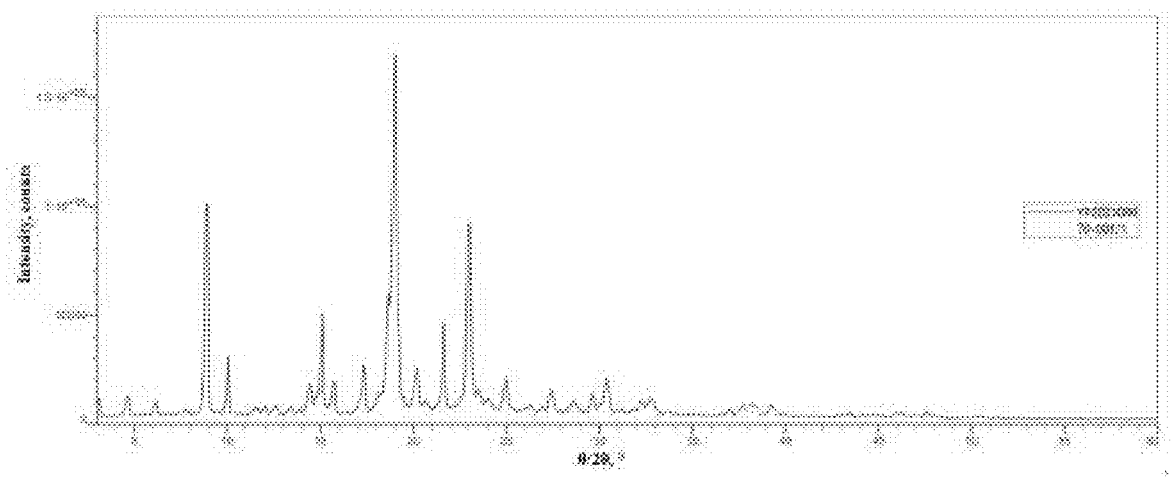
FIG. 1 is the X-ray powder diffraction pattern of the reduced coenzyme Q10 crystal prepared in Example 1 of the present disclosure.
FIG. 2 is the infrared absorption spectrum of the reduced coenzyme Q10 crystal prepared in Example 1 of the present disclosure.

Further specifically, the crystal form of reduced coenzyme Q10 has X-ray powder diffraction pattern determined with Cu-Kα radiation as shown in FIG. 1. For the XRD diffraction pattern shown in FIG. 1, the above characteristic peaks are completely different from the diffraction pattern of the crystal form reported in the prior art literature (CN103635452A), clearly indicating that that the crystal form of reduced coenzyme Q10 shown in FIG. 1 of the present disclosure is a novel polycrystalline form of reduced coenzyme Q10.

Further specifically, the infrared absorption spectrum of the crystal form of reduced coenzyme Q10 as measured by KBr compression method has characteristic absorption peaks at wavenumbers of 794±1 cm$^{-1}$, 877±1 cm$^{-1}$, 962 cm$^{-1}$ and 1014 cm$^{-1}$. Among the above absorption peaks, the peaks near 794±1 cm$^{-1}$ and 877±1 cm$^{-1}$ are characteristic absorption peaks formed by 2 peaks of equal intensity; and the peaks near 962 cm$^{-1}$ and 1014 cm$^{-1}$ are characteristic absorption peaks formed by 2 peaks of substantially equal intensity. Since the crystal forms of reduced coenzyme Q10 previously reported in the literature do not have these two absorption peaks at these wavenumbers, it is clearly indicated that the crystal form of reduced coenzyme Q10 provided by the present disclosure is a novel crystal form of reduced coenzyme Q10 which is different from the crystal forms previously reported in the literature.

More specifically, the crystal form of reduced coenzyme Q10 provided by the present disclosure has an infrared absorption spectrum measured by KBr compression method as shown in FIG. 2.

According to the present disclosure, a crystal form of reduced coenzyme Q10 is the novel crystal form of reduced coenzyme Q10 provided by the present disclosure as long as it has one or more of the DSC trace, XRD diffraction pattern, and IR absorption spectrum described above.

According to the present disclosure, the crystal form of reduced coenzyme Q10 has good water solubility, and the crystal form of reduced coenzyme Q10 has a solubility in purified water at 25° C., preferably greater than or equal to 0.01 wt %, more preferably greater than or equal to 0.1 wt %, and even more preferably greater than or equal to 0.5 wt %. The solubility of the crystal form of reduced coenzyme Q10 provided by the present disclosure is significantly higher than the solubility (below 0.001 wt %) shown by previously known crystal forms of reduced coenzyme Q10. As described above, since the crystal form of reduced coenzyme Q10 provided by the present disclosure shows a higher melting point and higher water solubility compared to the crystal forms of reduced coenzyme Q10 reported in the literature, it is not only a crystal form of reduced coenzyme Q10 structurally different from the crystal forms of reduced coenzyme Q10 reported in the literature, i.e., a novel crystal form of reduced coenzyme Q10 (or a crystalline solid comprising this crystal form), but also a more stable crystal form. The stable crystal form of reduced coenzyme Q10 provided by the present disclosure has high thermal stability and high water solubility.

The crystal form of reduced coenzyme Q10 provided by the present disclosure shows the excellent stability against oxygen molecular. Previously, it was known that reduced coenzyme Q10 was easily oxidized by oxygen molecular in air, but, as shown in examples below, the novel crystal form of reduced coenzyme Q10 and reduced coenzyme Q10 crystal containing it as the main component provided by the present disclosure show higher stability in air compared to the crystal forms listed in the literature, even without any protective measures against oxygen molecular. In addition, even when co-existing with crystal forms reported in the literature and other non-crystalline components, the crystal form of reduced coenzyme Q10 of the present disclosure can achieve its high stability against oxidation. For the crystalline solid of reduced coenzyme Q10 of the present disclosure, it also exhibits stability against oxidation, which cannot be attributed to previous knowledge. Considering factors including the amount of the novel crystal form of reduced coenzyme Q10 contained in the crystal or in the crystalline solid and the storage conditions, the stability against oxidation of the crystal form of the reduced coenzyme Q10 and the crystalline solid of the present disclosure cannot be generalized. For example, after a specified period storage in air under the conditions of 25° C. and dark, the retention rate (%) of the reduced coenzyme Q10 is about 80% or more in general, preferably about 85% or more, more preferably about 90% or more, and particularly preferably about 95% or more. It is to be noted that the retention rate herein refers to a ratio value of the absolute content (or the concentration in the crystalline solid) of the reduced coenzyme Q10 after a specified period of storage to the absolute content (or the concentration in the crystalline solid) of the reduced coenzyme Q10 before storage in the composition. In addition, the specified period is not particularly limited, for example 6 months, preferably 12 months, more preferably 36 months.

The crystal form of reduced coenzyme Q10 provided by the present disclosure has better stability and other better physical properties including water solubility and solvent residue compared to the crystal forms of reduced coenzyme Q10 reported in the literature. The crystal form provided by the present disclosure also overcomes the drawbacks of the previous reduced coenzyme Q10 that was very susceptible to oxidation and had limitations in its application. Furthermore, the crystal form of reduced coenzyme Q10 and the crystalline solid contain the same provided by the present disclosure not only have excellent stability, but also are outstanding in terms of high purity and low solvent residue.

The present disclosure further provides a method for preparing a crystal form of reduced coenzyme Q10 comprising step S) of crystallizing reduced coenzyme Q10 in the presence of a cyclic ether solvent, a fluorine-containing alcohol solvent and an organic base to obtain a crystal form of reduced coenzyme Q10.

Wherein, in the present disclosure, there is no special restriction on the source of all raw materials, and commercially available form thereof is applicable.

In accordance with the present disclosure, preferably, a reduced coenzyme Q10 is firstly mixed with a cyclic ether solvent and dissolved under heating, then a mixed solution of a fluorine-containing alcohol solvent and an organic base is added, and crystallization is carried out by cooling to obtain the crystal form of reduced coenzyme Q10.

In the present disclosure, the reduced coenzyme Q10 can be the reduced coenzyme Q10 known to the skilled person in the field, and there is no special limitation. The purity of the reduced coenzyme Q10 is preferably greater than or equal to 99%, more preferably greater than or equal to 99.5%.

For the solvent used during crystallization and subsequent processing, the use of alcohols for recrystallization as reported in the literature is not appropriate due to the fact that reduced coenzyme Q10 is difficult to dissolve in alcoholic solvents. Moreover, the crystallization system is prone to slurring after the addition of alcohols as a poor solvent, resulting in a difficulty in filtration, and the resulting crystal form remains the one initially reported in the literature. However, when using a single fatty acid ester or an ether as a solvent, the yield of crystallization is low due to the high solubility of the sample, unless the proportion of solvent or the temperature is reduced, the yield may be increased. However, this operation will pose a problem in that the system was relatively viscous and difficult to filter due to too low a temperature or a lower solvent ratio, and the crystal form obtained is the same as that reported in the literature. By using alkanes such as n-hexane, n-heptane, n-propane, and n-butane, the product with a high yield can be obtained under the conditions of an appropriate crystallization temperature and ratio of solvent and raw material, but the resulting crystal form is still Form I of reduced coenzyme Q10 reported in the literature, and its solvent residue is still difficult to meet the requirements after dry for 48 h.

It is found that after a large number of studies that by using a cyclic ether solvent as a good solvent, a fluorine-containing alcohol solvent as a poor solvent and a small amount of organic bases, besides a high yield, the precipitated crystal form has a higher stability and better impurity removal effect compared to the crystal forms reported in the literature.

The reduced coenzyme Q10 is mixed with a cyclic ether solvent and dissolved under heating. The cyclic ether solvent is preferably selected from the group consisting of 2-methyltetrahydrofuran, 3-methyltetrahydrofuran, tetrahydrofuran, 2,5-dimethyltetrahydrofuran, and a combination thereof. The ratio of the reduced coenzyme Q10 to the cyclic ether solvent is preferably 1 g:(1-10) mL, more preferably 1 g:(1-8) mL, more preferably 1 g:(1-5) mL, and most preferably 1 g:(1-3) mL. In some embodiments provided by the present disclosure, the ratio of the reduced coenzyme Q10 to the cyclic ether solvent is specifically 1 g: 2 mL or 1 g: 10 mL. The mixing and dissolving are preferably carried out at a temperature of 30° C. to 50° C., more preferably 35° C. to 45° C., and still more preferably 40° C.

Then a mixed solution of a fluorine-containing alcohol solvent and an organic base is added and cooled down for crystallization. The fluorine-containing alcohol solvent is preferably selected from the group consisting of trifluoromethanol, trifluoroethanol, trifluoropropanol, trifluorobutanol, and a combination thereof. The volume ratio of the cyclic ether solvent to the fluorine-containing alcohol solvent is preferably 1:(1-10), more preferably 1:(1-8), still more preferably 1:(1-7), and most preferably 1:(1-5). In some embodiments provided by the present disclosure, the volume ratio of the cyclic ether solvent to the fluorine-containing alcohol solvent is specifically 1:5 or 1:1; and the mass of the organic base is preferably 0.1% to 10% of the mass of the reduced coenzyme Q10, more preferably 0.5% to 10%, still more preferably 1% to 10%, and most preferably 5% to 10%. In some embodiments provided by the present disclosure, the mass of the organic base is preferably 5%, 7% or 10% of the mass of the reduced coenzyme Q10. The crystallization may be room-temperature crystallization or cooling crystallization, preferably cooling crystallization or cooling crystallization in combination with other crystallization methods. Specifically, the crystallization is preferably carried out at a temperature of 0° C. to 20° C. More specifically, in the present disclosure, the crystallization is preferably carried out at a temperature of 0° C. to 10° C., or 10° C. to 20° C., more preferably at 0° C. to 5° C., or 10° C. to 15° C. The crystallization is preferably carried out for more than 6 h, and more preferably for 6 to 24 h. Specifically, in the present disclosure, when the crystallization temperature is 0° C. to 10° C., the crystallization is carried out for 6 to 12 h, and when the crystallization temperature is 10° C. to 20° C., the crystallization is carried out for 12 to 24 h. The crystallization can be carried out under standing or stirring condition, and there is no special limitation. In the present disclosure, it is preferably carried out under stirring. The rotational speed with stirring is preferably not less than 200 rpm. In the present disclosure, a crystal seed can also be added after cooling, and the crystal seed is a crystal form of reduced coenzyme Q10 crystal. The crystallization is induced by the addition of the crystal seed, and there is no special limitation on the amount of the crystal seed to be added. In the present disclosure, the crystal seed is preferably more than or equal to 0.1% by mass of the reduced coenzyme Q10, more preferably 0.1% to 5%, further preferably 0.1% to 3%, still further preferably 0.5% to 3%, still even further preferably 1% to 2%, and most preferably 1% to 1.5%.

Under the above crystallization conditions, in order to improve conditions affecting crystallization of reduced coenzyme Q10, including solubility, concentration, yield, slurry properties or crystal properties, these solvents mentioned above can be mixed in preferred proportions in accordance with the properties of each solvent.

In a specific embodiment provided by the present disclosure, in order to obtain a target crystal form of reduced coenzyme Q10, the solubility of reduced coenzyme Q10 in solvents, etc., should be considered, so as to properly determine the concentration of crystallization or the retention time after crystallization. For example, when 2-methyltetrahydrofuran is used as a solvent, a solution of reduced coenzyme Q10 with a concentration of 50% in 2-methyltetrahydrofuran is prepared below 40° C., then a fluorine-containing alcohol and an organic base are added, the solution is cooled to 10° C. for crystallization. After precipitation of the reduced coenzyme Q10 crystal, it is kept in the solvent at 10° C. for more than 6 h, preferably for more than 8 h, and more preferably for more than 12 h. In this step, the mixture of precipitated reduced coenzyme Q10 crystal and solvent can be either stirred or left to stand, preferably stirred at a speed of not less than 200 r/min.

After crystallization, the step of solid-liquid separation/drying can be carried out as desired for recycling by, for example, a previously known method recited in the patent literature. For example, solid-liquid separation can be performed by filtration under pressure or centrifugal filtration, etc., and is generally performed by filtration under pressure of inert gas. In addition, the temperature for drying is confirmed according to the boiling point of the added solvent, and generally does not exceed 45° C. After drying, the crystalline solid can be crushed or graded (sieved) and recovered to obtain the crystal form of reduced coenzyme Q10, if desired.

It should be noted that the above crystallization and post-processing steps are preferably carried out in a deoxygenated environment. The deoxygenated environment can be created by replacing the gas with an inert gas, such as nitrogen, helium, argon and carbon dioxide gas, preferably nitrogen or argon gas.

In addition, once the crystal form of reduced coenzyme Q10 is manufactured or obtained, the crystal form of reduced coenzyme Q10 of the present disclosure can be manufactured under general conditions by adding the crystal form of reduced coenzyme Q10 of the present disclosure as a crystal seed during crystallization. In this case, the crystallization can be carried out by either a room-temperature crystallization or a cooling crystallization method, preferably cooling crystallization, or cooling crystallization in combination with other crystallization methods.

The present disclosure further provides a crystalline solid of reduced coenzyme Q10 comprising the crystal form of reduced coenzyme Q10 described above.

Specifically, the crystalline solid of reduced coenzyme Q10 can be obtained by adding the crystal form of reduced coenzyme Q10 provided by the present disclosure as a crystal seed during the crystallization process.

Further specifically, in the crystalline solid of reduced coenzyme Q10, the content of the crystal form of reduced coenzyme Q10 is preferably more than or equal to 0.1 wt %, more preferably more than or equal to 1 wt %, further preferably more than or equal to 10 wt %, further preferably more than or equal to 30 wt %, further preferably more than or equal to 50 wt %, further preferably more than or equal to 70 wt %, and most preferably more than or equal to 85 wt %. Where the lower limit of the content of the crystal form of reduced coenzyme Q10 provided by the present disclosure is one value described above, the upper limit corresponding to the respective lower limit is naturally 100 wt %. Whether the crystal form of reduced coenzyme Q10 provided by the present disclosure is present in the reduced coenzyme Q10 crystal or the crystalline solid of reduced coenzyme Q10 in the present disclosure in a mixed state with a crystal form previously reported in the literature and their proportions can be detected by, for example, DSC at a heating rate of 1 k/min. Under this condition, the respective endothermic peaks indicating the melting of the previously known reduced coenzyme Q10 crystal form and the crystal form of reduced coenzyme Q10 provided by the present disclosure are clearly separated. Since the magnitude of these peaks correlates with the mixing ratio, it is possible to unambiguously, even in the case of the crystal form and crystalline solid of reduced coenzyme Q10 of the present disclosure mixed with crystal forms of reduced coenzyme Q10 reported in the literature, to determine the presence of the novel crystal form of reduced coenzyme Q10 or its content.

The crystal form of reduced coenzyme Q10 provided in the present disclosure can also coexist as a crystalline solid with reduced coenzyme Q10 crystal previously reported in the literature as long as it is the crystal form of reduced coenzyme Q10 having the endothermic peak in DSC, the XRD diffraction pattern, or the IR absorption spectrum described above. Furthermore, as long as it is a crystalline solid containing the crystal form of reduced coenzyme Q10 of the present disclosure, it is within the scope of the present disclosure regardless of whether it is coexisting with other solid forms of reduced coenzyme Q10. It should be noted that since the crystal form of reduced coenzyme Q10 contained in the crystalline solid of reduced coenzyme Q10 in the present disclosure are more stable than the crystal forms reported in the literature, thus, even if such crystal forms of reduced coenzyme Q10 reported in the literature are present in a small amount in the crystalline solid of reduced coenzyme Q10 in the present disclosure, all crystal forms may change to the crystal form of reduced coenzyme Q10 provided by the present disclosure over time.

The present disclosure further provides a reduced coenzyme Q10 composition comprising the crystal form of reduced coenzyme Q10 and/or the crystalline solid of reduced coenzyme Q10 described above.

The crystal form of reduced coenzyme Q10, the crystalline solid of reduced coenzyme Q10 and the reduced coenzyme Q10 composition in the present disclosure are useful in food, nutritional functional food, specific healthcare food, nutritional supplement, animal medicine, beverage, feed, cosmetic, pharmaceutical, therapeutic, prophylactic, or pet medicinal food, and the like.

In order to further illustrate the present disclosure, the crystal form of reduced coenzyme Q10 and a preparation method therefor provided by the present disclosure are described in detail below in conjunction with examples.

The present disclosure relates to the following embodiments.

1. A crystal form of reduced coenzyme Q10 having an endothermic peak at 52±2° C. in a differential scanning calorimetry trace with a heating rate of 10 k/min.
2. The crystal form of reduced coenzyme Q10 according to embodiment 1, wherein the X-ray powder diffraction pattern with Cu-Kα radiation comprises characteristic peaks at diffraction angles (2θ±0.2°) of 8.95°, 10.04°, 15.09°, 18.65°, 19.03°, 21.61°, and 23.01°.
3. The crystal form of reduced coenzyme Q10 according to embodiment 1, wherein the infrared absorption spectrum of the crystal form of reduced coenzyme Q10 as detected by KBr compression method comprises characteristic absorption peaks at wavenumbers of 794±1 $cm^{-1}$, 877±1 $cm^{-1}$, 962 $cm^{-1}$, and 1014 $cm^{-1}$.
4. The crystal form of reduced coenzyme Q10 according to embodiment 1, which has an X-ray powder diffraction pattern as shown in FIG. 1, and/or
an infrared absorption spectrum as shown in FIG. 2, and/or
a differential scanning calorimetry trace as shown in FIG. 3.
5. A method for preparing the crystal form of reduced coenzyme Q10 according to embodiment 1, comprising:
step S): crystallizing reduced coenzyme Q10 in the presence of a cyclic ether solvent, a fluorine-containing alcohol solvent and an organic base to obtain a crystal form of reduced coenzyme Q10.
6. The method according to embodiment 5, wherein step S) comprises mixing and dissolving reduced coenzyme Q10 with a cyclic ether solvent under heating, adding a mixed solution of a fluorine-containing alcohol solvent and an organic base, and performing crystallization by cooling to obtain a crystal form of reduced coenzyme Q10,
wherein the crystallization is performed at a temperature of 0° C. to 20° C.
7. The method according to embodiment 5, wherein the cyclic ether solvent is selected from the group consisting of 2-methyltetrahydrofuran, 3-methyltetrahydrofuran, tetrahydrofuran, 2,5-dimethyltetrahydrofuran, and a combination thereof,
the fluorine-containing alcohol solvent is selected from the group consisting of trifluoromethanol, trifluoroethanol, trifluoropropanol, trifluorobutanol and a combination thereof, and the organic base is selected from the group consisting of triethylamine, pyridine, piperidine, and a combination thereof.

8. The method according to embodiment 5, wherein the reduced coenzyme Q10 and the cyclic ether solvent are in a ratio of 1 g:(1-10) mL;

the cyclic ether solvent and the fluorine-containing alcohol solvent are in a volume ratio of 1:(1-10); and the organic base is 0.1% to 10% by mass of the reduced coenzyme Q10.

9. A crystalline solid of reduced coenzyme Q10 comprising the crystal form of reduced coenzyme Q10 according to any one of embodiments 1 to 4 and/or a crystal form of reduced coenzyme Q10 prepared by the method according to any one of embodiments 5 to 8.

10. A reduced coenzyme Q10 composition comprising the crystal form of reduced coenzyme Q10 according to any one of embodiments 1 to 4, and/or a crystal form of reduced coenzyme Q10 prepared by the method according to any one of embodiments 5 to 8; and/or the crystalline solid of reduced coenzyme Q10 according to embodiment 9.

In particular, it is noted that the detection conditions for X-ray powder diffraction (XRD), differential scanning calorimetry (DSC) and infrared spectroscopy (IR) analysis in the examples are shown below.

Detection Conditions for XRD Detection:
Equipment model: X-ray powder diffractometer/Smart Lab SE
X-ray tube: Cu target
Speed: 10°/min
Scanning range: 3°-60°
Step size: 0.02°
Slit width: 10 mm
Output voltage: 40 kV
Output current: 40 mA Detection Conditions for DSC Detection:
Equipment model: Differential scanning calorimeter/ Netzsch DSC 214
Sample crucible: Concavus Al
Heating rate: 10 K/min
Temperature range for detection: 30° C.-300° C.
Purging/protective gas: $N_2$ Detection Conditions for IR Detection:
Equipment model: SHIMADZU Fourier Transform Infrared Spectrophotometer IRTracer-100
Detection method: KBr compression method Example 1

Under the protection of nitrogen, 100 g of commercially available reduced coenzyme Q10 (purity: 99.5%) and 200 mL of 2-methyltetrahydrofuran were added to a 3 L three-necked flask, heated to 40° C. with stirring until complete dissolution, cooled to 10° C., and then 1000 mL of trifluoroethanol and 5 g of triethylamine were slowly added dropwise. The resulting mixture was cooled to 2° C., continuously stirred for 12 h with maintaining the temperature, filtered, washed with 20 mL of trifluoroethanol, and then dried under reduced pressure at 40° C. for 6-8 h to obtain a granular crystal of reduced coenzyme Q10.

The results of the DSC analysis showed the endothermic peak indicating melting at 52.2° C. at a heating rate of 10 k/min, as shown in FIG. 3.

The results of X-ray powder diffraction analysis, as shown in FIG. 1, show characteristic peaks at diffraction angles (2θ±0.2°) of 8.95°, 10.04°, 15.09°, 17.36°, 18.65°, 19.03°, 20.19°, 21.61°, and 23.01°.

Further, the results of the IR analysis, as shown in FIG. 2, which are different from the reduced coenzyme Q10 crystals of the literature, show characteristic absorption peaks at near 794±1 $cm^{-1}$, 877±1 $cm^{-1}$, 962 $cm^{-1}$, and 1014 $cm^{-1}$.

Based on the above analytical results, it was confirmed that the reduced coenzyme Q10 crystal obtained in the present example was a different crystal form from the reduced coenzyme Q10 of the literature. The solubility of the obtained crystal form in purified water was determined to be 0.5% by weight at 25° C.

Example 2

Under the protection of nitrogen, 100 g of commercially available reduced coenzyme Q10 (purity: 99.5%) and 1000 mL of 2,5-dimethyltetrahydrofuran were added to a 3 L three-necked flask, heated to 40° C. with stirring until complete dissolution, and then 1000 mL of trifluoropropanol and 7 g of triethylamine were slowly added dropwise. The resulting mixture was cooled to 10° C., added with 1 g of crystal seed (obtained in Example 1), stirred for 1 h, cooled to 2° C., stirred continuously for 12 h while maintaining the temperature, filtered, washed with 20 mL of trifluoropropanol, and then dried under reduced pressure at 40° C. for 6-8 h to obtain a crystal.

The results of the DSC analysis showed the endothermic peak indicating melting at 50.2° C. at a heating rate of 10 k/min.

The crystal obtained in Example 2 was analyzed and detected by using X-ray powder diffraction and infrared spectroscopy, and the detection results were similar to those of Example 1, with an error within the permissible range, and it was determined that the crystal obtained in Example 2 is of the same crystal form as the crystal of Example 1.

Based on the above analytical results, it was confirmed that the crystal of reduced coenzyme Q10 obtained in the present example is of a different crystal form from the reduced coenzyme Q10 reported in the literature. The solubility of the obtained crystal in purified water was determined to be 0.5% by weight at 25° C.

Example 3

Under the protection of nitrogen, 100 g of commercially available reduced coenzyme Q10 and 1000 mL of tetrahydrofuran were added to a 3 L three-necked flask, heated to 40° C. with stirring until complete dissolution, and then 1000 mL of trifluoroethanol and 10 g of triethylamine were slowly added dropwise. The resulting mixture was cooled to 10° C., added with 1 g of crystal seed (obtained in Example 1), stirred for 1 h, cooled to 2° C., stirred continuously for 12 h while maintaining the temperature, filtered, washed with 20 mL of trifluoroethanol, and then dried under reduced pressure at 40° C. for 6-8 h to obtain a crystal.

The results of DSC analysis showed the endothermic peak indicating melting at 52.2° C. at a heating rate of 10 k/min. In addition, the analysis results of X-ray powder diffraction confirmed that the reduced coenzyme Q10 crystal obtained in this Example is of the same crystal form as the reduced coenzyme Q10 in Example 1.

Comparative Example 1 (Example 1 in CN103635452A)

After nitrogen replacement inside a 300 mL reaction flask (made of heat-resistant glass), 40 g of commercially available reduced coenzyme Q10 (a crystal of reduced coenzyme Q10 previously known, made by Kaneka Corporation) and 60 g of n-hexane were added, heated to 40° C. with stirring until complete dissolution. This solution was cooled to 25° C. at a cooling rate of 10° C./h, stirred continuously for 96 h while maintaining the temperature at 25° C., filtered and dried under reduced pressure at 20° C.-40° C. to obtain a crystal.

The results of DSC analysis showed the endothermic peak indicating melting at 50.2° C. at a heating rate of 10 k/min.

Figure 4:
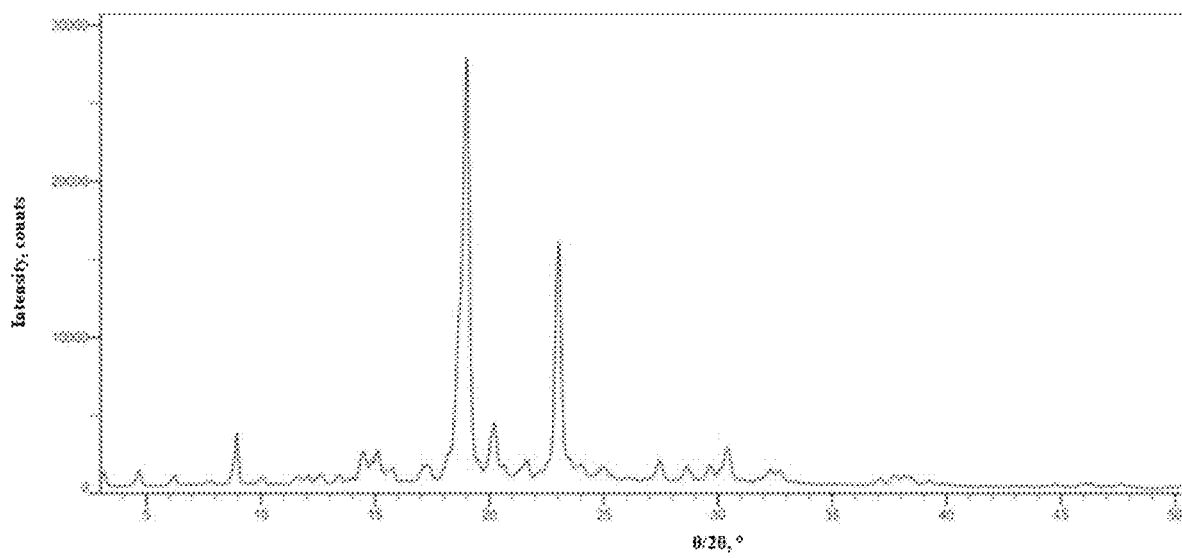
FIG. 4 is the X-ray powder diffraction pattern of the reduced coenzyme Q10 crystal prepared in Comparative Example 1 of the present disclosure.

In addition, the analysis results of X-ray powder diffraction confirmed that the crystal of reduced coenzyme Q10 obtained in this Example is of the same crystal form as Form I of reduced coenzyme Q10, rather than Form II as reported in the literature. It was confirmed in experiments that the crystal form obtained by using solvents reported in other patents, such as ethanol and heptane, was also Form I as shown in FIG. 4, thus the use of conventional solvents for crystallization may be difficult to improve the stability of reduced coenzyme Q10.

Example 4

Figure 5:
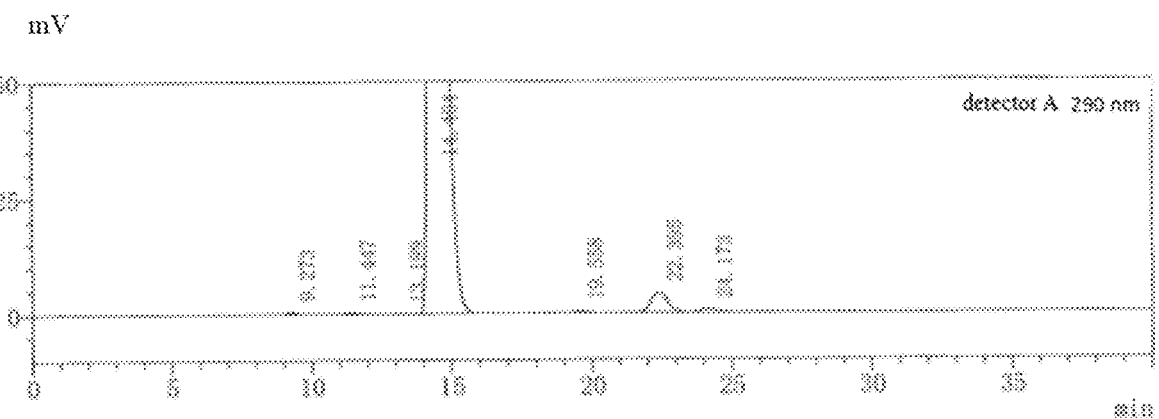
FIG. 5 is the HPLC chromatogram of the reduced coenzyme Q10 crystal prepared in Example 1 of the present disclosure after storage for 360 days.
Figure 6:
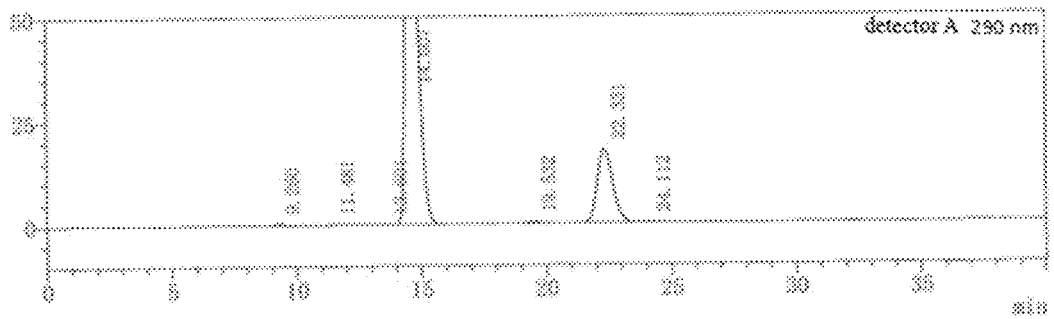
FIG. 6 is the HPLC chromatogram of the reduced coenzyme Q10 prepared crystal in Comparative Example 1 of the present disclosure after storage for 360 days.

The crystal of reduced coenzyme Q10 obtained in Example 1 and the crystal obtained in Comparative Example 1 were each placed in a vacuum bag, and stored at 25° C. in the dark. The weight ratio of reduced coenzyme Q10 to oxidized coenzyme Q10 was calculated by the HPLC analysis, and the results are shown in Table 1. FIG. 5 shows the HPLC chromatogram of the crystal of reduced coenzyme Q10 prepared in Example 1 after storage for 360 days. FIG. 6 shows the HPLC chromatogram of the crystal of reduced coenzyme Q10 prepared in Comparative Example 1 after storage for 360 days.

Conditions for HPLC Analysis:
  Chromatographic column: (Agilent) ZORBAX Extend C18 4.6×150 mm, 5 um
  Mobile phase: mobile phase A: acetonitrile, mobile phase B: isopropanol, mobile phase C: methanol
  Detection wavelength: 290 nm
  Flow rate: 1.5 mL/min
  Column temperature: 35° C.
  Injection concentration: 1 mg/mL
  Injection volume: 20 μL
  The elution protocol is shown in Table 2.

TABLE 1 results of stability test
weight ratio of reduced coenzyme Q10 to oxidized coenzyme Q10

| day | sample in Example 1 | sample in Comparative Example 1 |
|---|---|---|
| 0 | 99.18/0.40 | 98.20/0.65 |
| 15 | 99.00/0.50 | 97.10/1.63 |
| 30 | 98.01/0.80 | 93.40/5.47 |
| 180 | 97.90/1.10 | 89.60/8.8 |
| 360 | 97.33/1.94 | 82.0/17.0 |

TABLE 2 elution protocol

| time (min) | mobile phase A (%) | mobile phase B (%) | mobile phase C (%) |
|---|---|---|---|
| 0 | 43 | 17 | 40 |
| 40 | 43 | 17 | 40 |

As shown in the above results, it was confirmed that the crystal form of reduced coenzyme Q10 of the present disclosure have higher stability compared to the crystal form reported in the literature and that a higher purity can be obtained using this crystallization method.

Comparative Example 3

Figure 7:
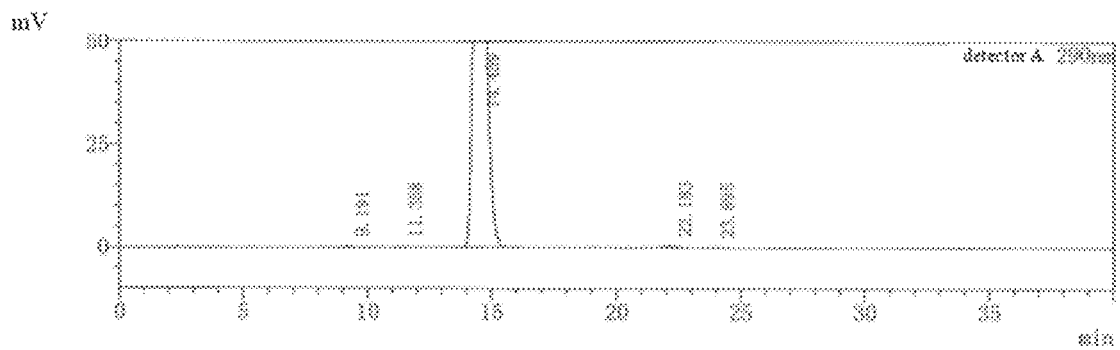
FIG. 7 is the HPLC chromatogram of the reduced coenzyme Q10 crystal prepared in Example 1 of the present disclosure.
Figure 8:
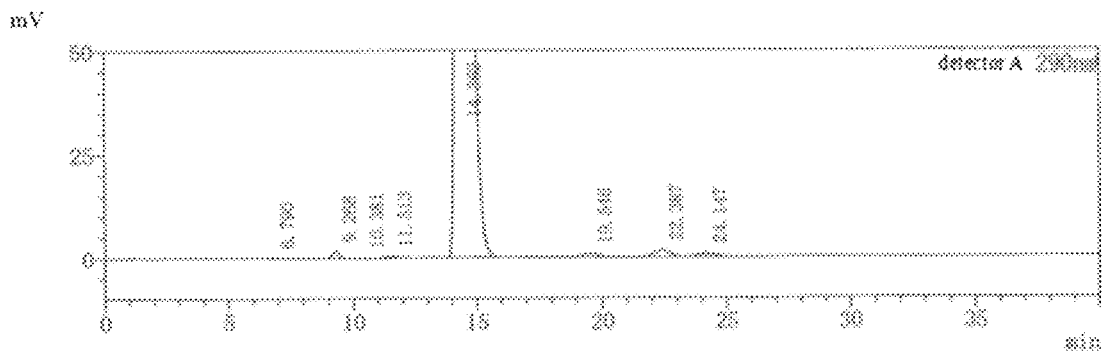
FIG. 8 is the HPLC chromatogram of the reduced coenzyme Q10 crystal prepared in Comparative Example 1 of the present disclosure.

The detection was carried out by using the HPLC method of patent CN103635452, the results are shown in FIG. 7 and FIG. 8, wherein FIG. 7 is the HPLC chromatogram of the crystal form of reduced coenzyme Q10 prepared in Example 1, and FIG. 8 is the HPLC chromatogram of the crystal form of reduced coenzyme Q10 prepared in Comparative Example 1, indicating that the results obtained by the method herein and the method in literature are close to each other.

Example 5

The crystal forms of reduced coenzyme Q10 obtained in Example 1 and Comparative Example 1 were subjected to solvent residue detection and the results are shown in Table 3.

Conditions for GC Analysis:
  Chromatographic column: PEG-20M 30 m×0.53 mm, 1.0 m or a capillary column of equivalent efficiency
  Heating rate: The initial temperature was 35° C., held for 10 minutes, and was increased to 220° C. at a rate of 20° C./minute.
  Injector temperature: 200° C.
  Detector temperature: 250° C.
  Headspace time: 20 min
  Headspace temperature: 70° C.
  Injection volume: 1 mL

TABLE 3 detection results of residual solvent

| | 2-methyltetrahydrofuran | trifluoroethanol | triethylamine |
|---|---|---|---|
| | residual solvent | | |
| Example 1 | not detected residual solvent (n-hexane) | 0.012% | not detected |
| Comparative Example 1 | | 0.05% | |

The above disclosed preferred embodiments of the present disclosure are only used to help illustrate the present disclosure. However, the present disclosure is not limited thereto. Those skilled in the field may understand that, within the scope of the technical conception of the present disclosure, modifications may be made to the technical solutions of the present disclosure, or combinations of some of the technical features may be made in any other manner, and these modifications or combinations do not cause the essence of the corresponding technical solutions to be out of the spirit and scope of the technical solutions of each embodiment of the present disclosure, and should be regarded as the disclosed contents of the present disclosure, which all fall within the scope of the protection of the present disclosure.

The invention claimed is:

1. A method for preparing a crystal form of reduced coenzyme Q10, wherein the crystal form of reduced coenzyme Q10 has an endothermic peak at 52±2° C. in a differential scanning calorimetry trace with a heating rate of 10 k/min, and has an X-ray powder diffraction pattern as shown in FIG. 1; and the method comprises:
  mixing and dissolving reduced coenzyme Q10 with a cyclic ether solvent under heating, adding a mixed solution of a fluorine-containing alcohol solvent and an organic base, and performing crystallization by cooling to obtain a crystal form of reduced coenzyme Q10;
  wherein the crystallization is performed at a temperature of 0° C. to 20° C.;
  the reduced coenzyme Q10 and the cyclic ether solvent are in a ratio of 1 g:(2-10) mL;
  the cyclic ether solvent and the fluorine-containing alcohol solvent are in a volume ratio of 1:(1-5); and
  the organic base is 5% to 10% by mass of the reduced coenzyme Q10;
  wherein the cyclic ether solvent is selected from the group consisting of 2-methyltetrahydrofuran, tetrahydrofuran, and a combination thereof;
  the fluorine-containing alcohol solvent is selected from the group consisting of trifluoromethanol, trifluoroethanol, trifluoropropanol, trifluorobutanol and a combination thereof; and
  the organic base is triethylamine.

2. The method according to claim 1, wherein the infrared absorption spectrum of the crystal form of reduced coenzyme Q10 as detected by KBr compression method comprises characteristic absorption peaks at wavenumbers of 794±1 cm$^{-1}$, 877±1 cm$^{-1}$, 962 cm$^{-1}$, and 1014 cm$^{-1}$.

3. The method according to claim 1, wherein the crystal form of reduced coenzyme Q 10 has an infrared absorption spectrum as detected by KBr compression method as shown in FIG. 2, and/or a differential scanning calorimetry trace as shown in FIG. 3.

* * * * *